(12) United States Patent
Yohe et al.

(10) Patent No.: US 7,634,894 B2
(45) Date of Patent: Dec. 22, 2009

(54) SYSTEM AND METHOD FOR PALLETIZING ARTICLES

(75) Inventors: Peter D. Yohe, Bloomsburg, PA (US); Ronald H. Cordingly, Berwick, PA (US); Justin L. Mowery, Bloomsburg, PA (US)

(73) Assignee: Dyco, Inc., Bloomsburg, PA (US)

( * ) Notice: Subject to any disclaimer, the term of this patent is extended or adjusted under 35 U.S.C. 154(b) by 105 days.

(21) Appl. No.: 11/552,401

(22) Filed: Oct. 24, 2006

(65) Prior Publication Data
US 2008/0095601 A1    Apr. 24, 2008

(51) Int. Cl.
B65B 35/52    (2006.01)
B65G 57/22    (2006.01)

(52) U.S. Cl. .............................. 53/447; 53/157; 53/541; 414/792.6

(58) Field of Classification Search .................. 53/157, 53/447, 448, 443, 156, 535, 537, 540, 541; 414/792.6
See application file for complete search history.

(56) References Cited

U.S. PATENT DOCUMENTS

| | | | | |
|---|---|---|---|---|
| 2,962,163 A | * | 11/1960 | Thompson | 206/322 |
| 3,568,393 A | * | 3/1971 | King et al. | 53/399 |
| 3,682,290 A | | 8/1972 | Von Gal, Jr. et al. | |
| 3,710,532 A | | 1/1973 | Smilek et al. | |
| 3,884,935 A | * | 5/1975 | Burns, III | 206/322 |
| 4,036,364 A | * | 7/1977 | Ambrose | 206/526 |
| 4,667,808 A | | 5/1987 | Mastak | |
| 4,708,564 A | | 11/1987 | Mylrea et al. | |
| 4,744,465 A | * | 5/1988 | Parker | 206/597 |
| 4,772,170 A | * | 9/1988 | Oldfield | 414/792.9 |
| 4,852,330 A | * | 8/1989 | Carangelo | 53/399 |
| 4,876,841 A | * | 10/1989 | Jensen | 53/399 |
| 4,941,374 A | * | 7/1990 | Focke | 83/13 |
| 4,955,940 A | * | 9/1990 | Welleman | 108/56.1 |
| 5,046,303 A | * | 9/1991 | Becicka et al. | 53/540 |
| 5,085,030 A | * | 2/1992 | Segawa et al. | 53/399 |
| 5,090,177 A | * | 2/1992 | Gombos et al. | 53/399 |
| 5,175,692 A | | 12/1992 | Mazouz et al. | |
| 5,195,295 A | * | 3/1993 | Kurosaki | 53/399 |
| 5,203,671 A | * | 4/1993 | Cawley et al. | 414/791.6 |
| 5,351,461 A | | 10/1994 | Fandard et al. | |
| 5,540,545 A | * | 7/1996 | Roberts et al. | 414/792.6 |
| 5,701,722 A | | 12/1997 | Franklin et al. | |
| 5,758,471 A | * | 6/1998 | Denley et al. | 53/399 |
| 5,794,417 A | * | 8/1998 | Mohrman | 53/541 |
| 5,829,364 A | * | 11/1998 | Urbach | 108/56.1 |
| 5,844,807 A | | 12/1998 | Anderson et al. | |
| 5,873,214 A | | 2/1999 | Moore et al. | |
| 6,019,226 A | * | 2/2000 | Zajdlik et al. | 206/600 |
| 6,050,419 A | * | 4/2000 | Flanagan et al. | 206/597 |
| 6,059,519 A | * | 5/2000 | Dutto et al. | 414/791.6 |
| 6,122,896 A | * | 9/2000 | Weder et al. | 53/399 |
| 6,431,817 B1 | | 8/2002 | Simkowski | |

(Continued)

*Primary Examiner*—Paul R Durand
(74) *Attorney, Agent, or Firm*—McNees Wallace & Nurick LLC

(57) ABSTRACT

A system is provided for palletizing articles including a stacking area for stacking palletized article layers. Each palletized article layer is constructed from a plurality of arranged articles. The stacking area includes a structural member for structurally carrying a stabilizer over the stacking area. The stabilizer provides substantially continuous lateral support along the periphery of arranged articles of the article layer being constructed to substantially prevent tipping of the plurality of arranged articles.

13 Claims, 9 Drawing Sheets

U.S. PATENT DOCUMENTS

| | | |
|---|---|---|
| 6,543,600 B2 | 4/2003 | Ouellette |
| 6,658,816 B1 | 12/2003 | Parker et al. |
| 6,742,459 B2 * | 6/2004 | Lucas ........................ 108/55.1 |
| 6,880,311 B2 * | 4/2005 | Winkler ........................ 53/399 |
| 7,013,618 B2 * | 3/2006 | Schiltz et al. ................. 53/411 |
| 7,017,798 B2 * | 3/2006 | Pope et al. ................... 229/169 |

* cited by examiner

SYSTEM AND METHOD FOR PALLETIZING ARTICLES

FIELD OF THE INVENTION

The present invention is directed to a system and method for palletizing articles, and specifically to a system and method for palletizing articles subject to tipping.

BACKGROUND OF THE INVENTION

When large numbers of stackable articles must be transported in large quantities to another location, especially when the article is small, the article may be packaged in a container to protect the article during shipping of the container. Alternately, to reduce the amount of handling required, the articles may be arranged in a tight grouping, or array of articles. Each array of articles can form a layer of articles that can be stacked on a pallet having a footprint which can be accommodated by freight hauling compartments, e.g., for truck, rail, sea or air vessels.

Palletizing articles is becoming increasingly automated in manufacturing facilities, wherein articles are moved via a conveyor, which articles are manipulated by robots onto pallets. Such processing may work well if the articles are inherently stable, i.e., having a broad base footprint and low center of gravity, which articles being resistant to tipping. However, there can be difficulties associated with elongated articles having a small base footprint, as such articles are susceptible to tipping. Moreover, problems associated with tipping articles are significantly increased when the articles are especially lightweight, such as empty articles, that are shipped to locations for filling the articles with product.

Assembly of article arrays is currently performed using conventional bulk palletizers. Most conventional bulk palletizers build the complete article array or bulk array or article layer and then move or "sweep" the completed array layer or bulk array into position onto the pallet. Palletizing robots are also used, but most palletizing robots also move the completed article layer or bulk array onto the pallet. Alternately, the palletizing robots construct an article array by placing individual rows of articles to form the array. However, the previously discussed problems associated with article tipping have not been resolved. In addition, the conventional palletizer constructions are difficult to be quickly and cost effectively re-configured to accommodate different article designs or array patterns.

What is needed is an apparatus and method that effectively palletize articles while substantially eliminating the possibility of articles tipping during palletization, that is also easily configured to accommodate different article designs or array patterns.

SUMMARY OF THE INVENTION

The present invention is directed to a system and method that provides continuous lateral support along the periphery of articles being constructed to form article layers. Once a first article layer is constructed, a subsequent article layer is constructed on top of the first article layer, this procedure being repeated until a full pallet of article layers is constructed. Provision of continuous lateral support substantially prevents tipping of the articles.

One aspect of the present invention relates to a method for palletizing articles. The method includes the steps of arranging a plurality of articles within a first collection area and transporting the plurality of articles from the first collection area to a stacking area for constructing a palletized article layer. The method further includes the step of laterally supporting the periphery of the plurality of articles arranged within the stacking area to substantially prevent tipping of the plurality of articles. The method further includes the steps of arranging a subsequent plurality of articles within the first collection area and transporting the subsequent plurality of articles from the first collection area to the stacking area adjacent the plurality of arranged articles. The periphery of the plurality of arranged articles is continuously laterally supported while the subsequent plurality of articles is being arranged. Upon the arrangement of the subsequent plurality of articles, the periphery of the plurality of arranged and subsequently arranged articles is laterally supported. The method further includes the step of repeating the arrangement and transporting of subsequent plurality of articles until the article layer is constructed.

The present invention further relates to a system for palletizing articles, including a stacking area for stacking palletized article layers. Each palletized article layer is constructed from a plurality of arranged articles. The stacking area includes a structural member for structurally carrying a stabilizer over the stacking area. The stabilizer provides substantially continuous lateral support along the periphery of arranged articles of the article layer being constructed to substantially prevent tipping of the plurality of arranged articles.

The present invention still further relates to a method for palletizing articles. The method includes the steps of arranging a plurality of articles within a first collection area and transporting the plurality of articles from the first collection area to a stacking area for constructing a palletized article layer. The method further includes the steps of laterally supporting the periphery of the plurality of articles arranged within the stacking area to substantially prevent tipping of the plurality of articles and arranging a subsequent plurality of articles within the first collection area. The method further includes the step of transporting the subsequent plurality of articles from the first collection area to the stacking area adjacent the plurality of arranged articles. The periphery of the plurality of arranged articles is continuously laterally supported while the subsequent plurality of articles is being arranged. Upon the arrangement of the subsequent plurality of articles, the periphery of the plurality of arranged and subsequently arranged articles are laterally supported. The method further includes the steps of repeating the steps of arranging and transporting of subsequent plurality of articles until the article layer is constructed and placing a covering over the constructed article layer. The method further includes repeating the steps of arranging, transporting and laterally supporting plurality of articles, arranging, transporting and repeating the steps of arranging and transporting of subsequent plurality of articles to construct article layers vertically stacked on top of each other until a full pallet of article layers is constructed.

An advantage of the present invention is that articles being arranged on a pallet are substantially prevented from tipping.

A further advantage of the present invention is that it can be quickly and cost effectively re-configured to accommodate different article designs or array patterns.

A still further advantage of the present invention is that the robotic end of arm tooling (EOAT) can be quickly and easily changed to another EOAT.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
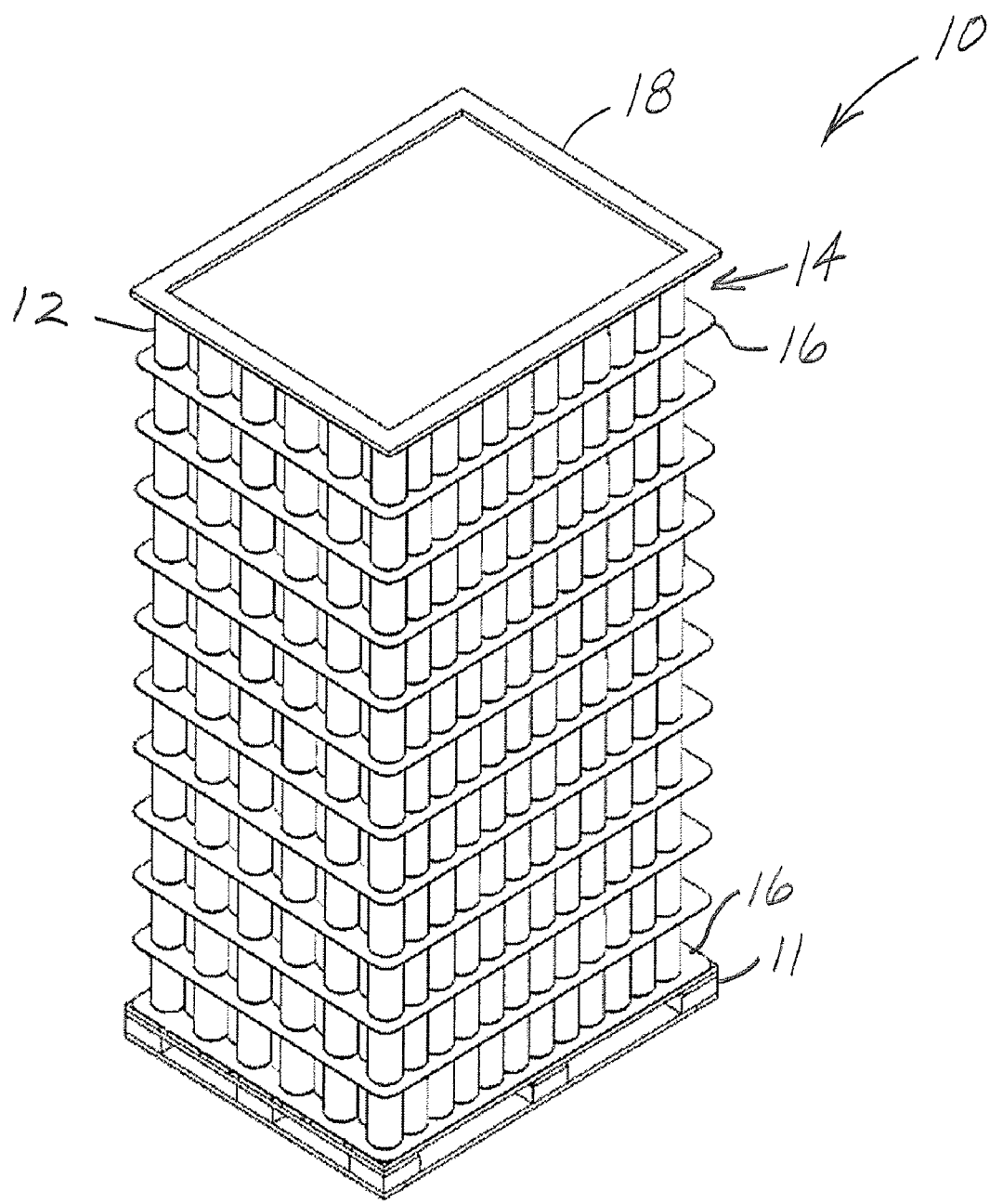
FIG. 1 is a perspective view of a full pallet of article layers produced by the present invention.
Figure 2:
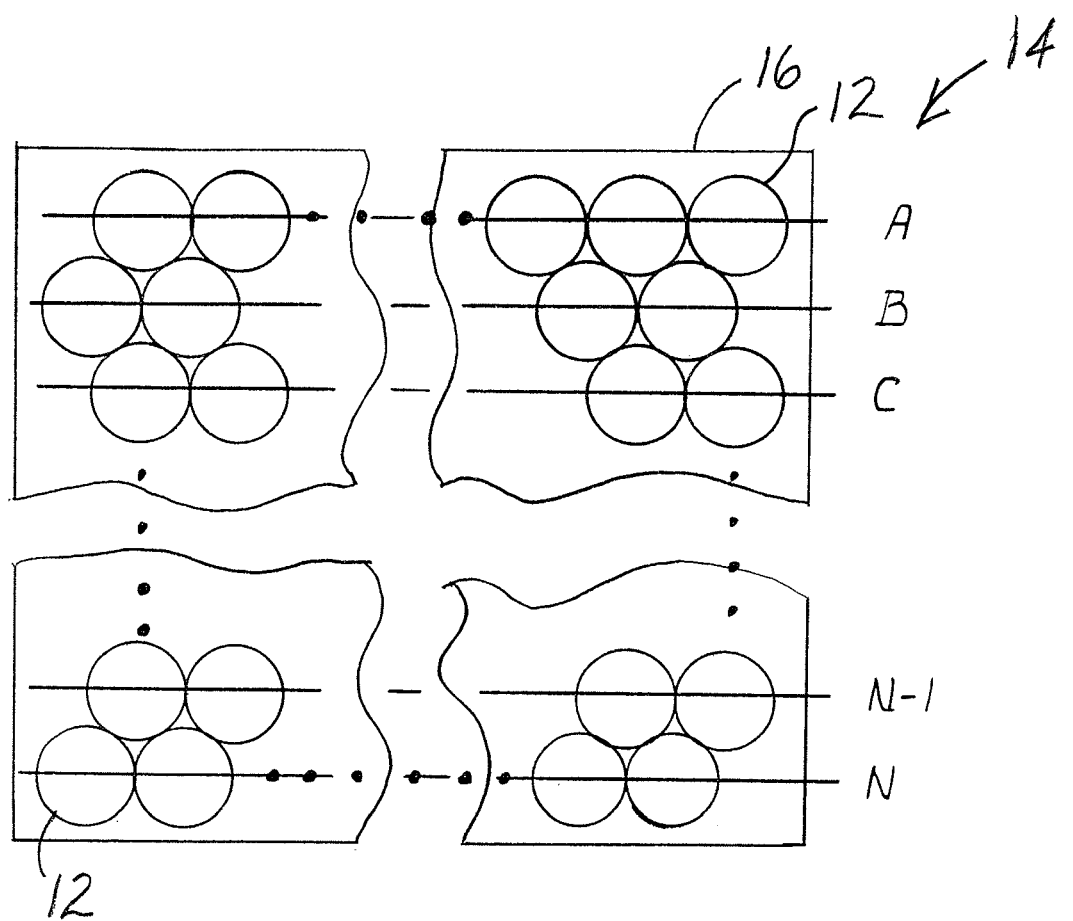
FIG. 2 is a schematic of an article layer produced by the present invention.

The present invention includes a system and method for constructing palletized articles 10 as shown in FIGS. 1 and 2. Palletized articles 10 are typically constructed by establishing a stacking area, then positioning a pallet 11 over the stacking area (see e.g., FIG. 3). Pallet 11 is overlain with a covering 16, such as a slip sheet, to provide a uniform substantially flat surface on which to arrange articles 12 to form an article layer 14. Alternately, instead of a slip sheet, a tray having a peripheral flange or other component can be used to achieve separation between adjacent article layers 14. As shown for cylindrically shaped articles 12, alternately staggered rows A through N are constructed, typically by transporting already arranged rows or partial rows from another collection area. Once the number of rows of articles associated with article layer 14 have been constructed, slip sheet or covering 16 is placed over the article layer 14. The sequence of arranging rows to construct another article layer 14 followed by an overlaid covering 16 is repeated until a full pallet of article layers is constructed, the covering over the top article layer typically being a top frame 18. The present invention also includes constructing palletized articles 10 while substantially preventing tipping of articles being arranged during the construction of the article layers 14 and/or constructed article layers 14 as will be discussed in further detail below.

Figure 3:
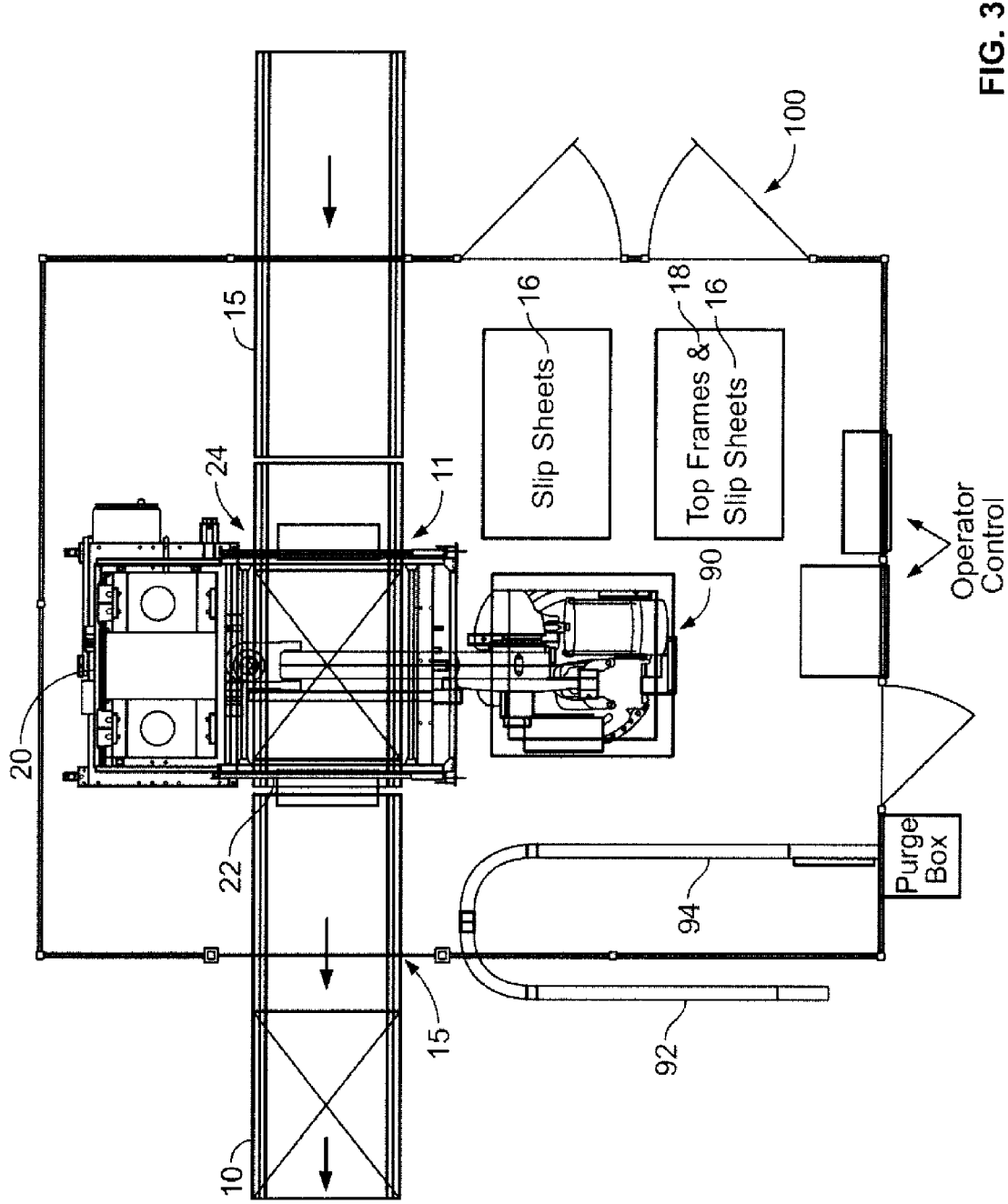
FIG. 3 is plan view of a robotic palletizing cell of the present invention.

One embodiment of a robotic palletizing cell 100 of the present invention to construct palletized articles 10 is shown in FIG. 3, including a structural member 20 that structurally carries a stabilizer 22. Stabilizer 22 is located above a stacking area 24 that receives a pallet 11 and a slip sheet or covering 16 that overlays the pallet. As described in additional detail below, stabilizer 22 provides substantially continuous lateral support along the periphery of partially constructed or both partially constructed and fully constructed article layers 14 (FIGS. 1, 2). Optionally, a pallet conveyor 15 is provided to facilitate transport of the palletized articles 10 to and from palletizing cell 100. An article conveyor 92 receives articles 12 (FIGS. 1, 2) from exterior of the palletizing cell 100, directing and arranging the articles along a collection area 94. Article conveyor 92, as shown, represents a one line system. That is, articles 12 (FIGS. 1, 2) loaded within article conveyor 92 are directed to move along the conveyor in a single line (single file) i.e., the articles moving one after the other, instead of side-by-side.

However, it is to be understood that another embodiment of article conveyor 92 can also direct articles along multiple lines. It is also to be understood that an embodiment of article conveyor 92 may arrange articles on top of each other, e.g., using a sloped surface and then vertically stacking the articles. Alternately, a multiple conveyor arrangement or other arrangement resulting in multiple vertically arranged rows of articles can also be used. A collection area 94 includes a region from which articles 12 (FIGS. 1, 2) can be taken and transported to stacking area 24, such as by a palletizing robot 90. Robot 90 can additionally place coverings 16, 18, such as slip sheets and top frames over completed or constructed article layers 14 (FIG. 1) at stacking area 24. In one embodiment, robot 90 is an industrial robot, such as an anthropomorphic robotic device, or other device capable of transferring rows or multiple rows or partial rows to stacking area 24. It is to be understood that the end effector or end of arm tooling (EOAT) can be article specific, and easily and quickly changed to another EOAT.

Figure 4:
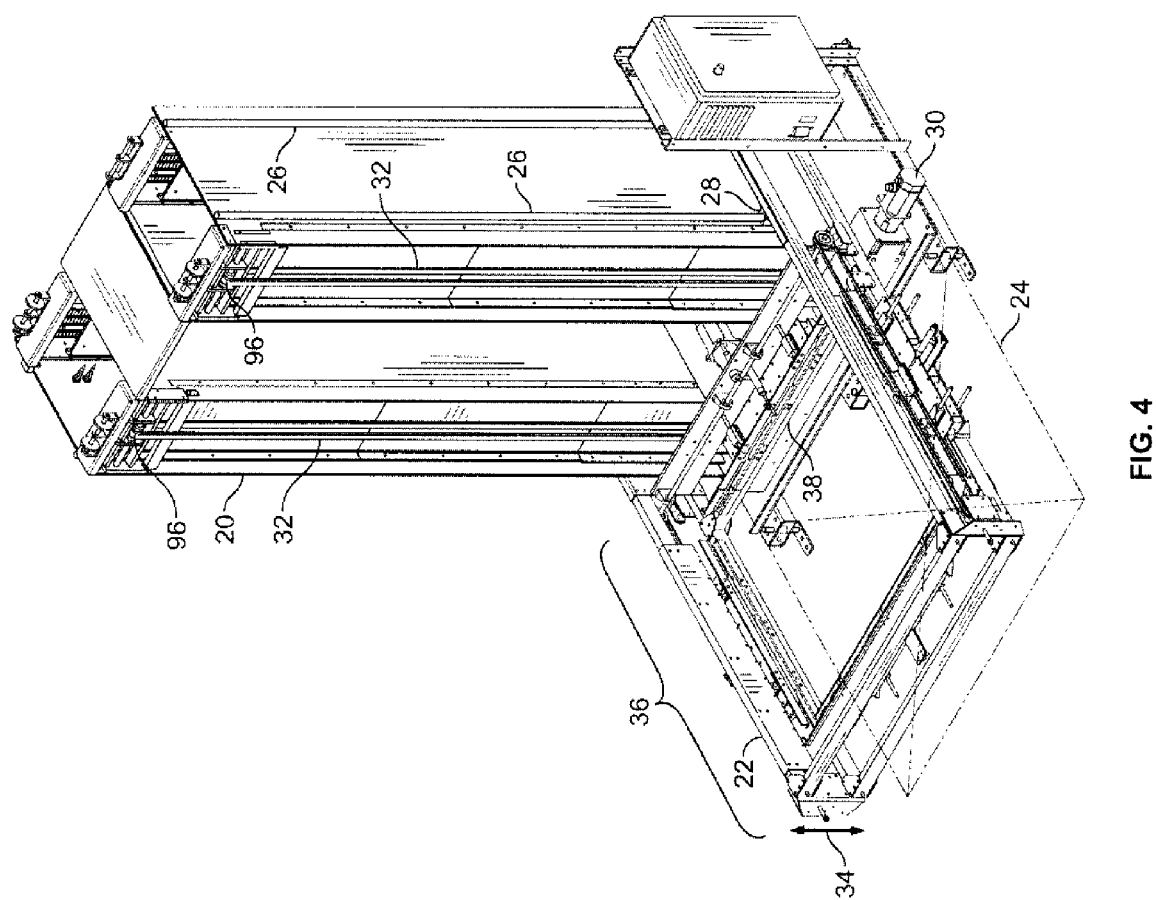
FIG. 4 is a perspective view of an embodiment of a structural member and lateral support system of the present invention.

As shown in FIG. 4, structural member 20, such as a vertically extending tower, structurally carries stabilizer 22 to travel in a substantially vertical direction 34 over stacking area 24 of the palletizing cell 100 (FIG. 3). Stabilizer 22 includes fittings 28 (one visible in FIG. 4) that slidingly receive opposed pairs of guides 26 disposed along opposite surfaces of structural member 20 to provide a predetermined travel path for the stabilizer when the stabilizer is directed to guided movement with respect to the structural member 20. Driven vertical movement of stabilizer 22 is provided by a pair of vertically disposed belts 32 that are secured adjacent to a proximal side 38 of a box portion 36 of stabilizer 22. In one embodiment, a servo motor 30 controls the translational movement of belts 32 between pairs of pulleys 96, with only the upper pulleys 96 adjacent the apex of structural member 20 being visible in FIG. 4. The combination of structural member 20 and stabilizer 22 can be referred to as a lateral control system that provides substantially continuous lateral support along the periphery of partially constructed or both partially constructed and fully constructed article layers 14 (FIGS. 1, 2).

A controller or control system, such as a microprocessor, can control the components to provide lateral support based on predetermined settings. In other words, depending upon the type of articles being palletized, lateral support may best be achieved by providing actual physical contact as well as an associated force exerted by the stabilizer 22 guide rails to corresponding portions of the article layer periphery, or by providing sufficient proximity without physical contact as will be discussed in additional detail below.

Figure 5:
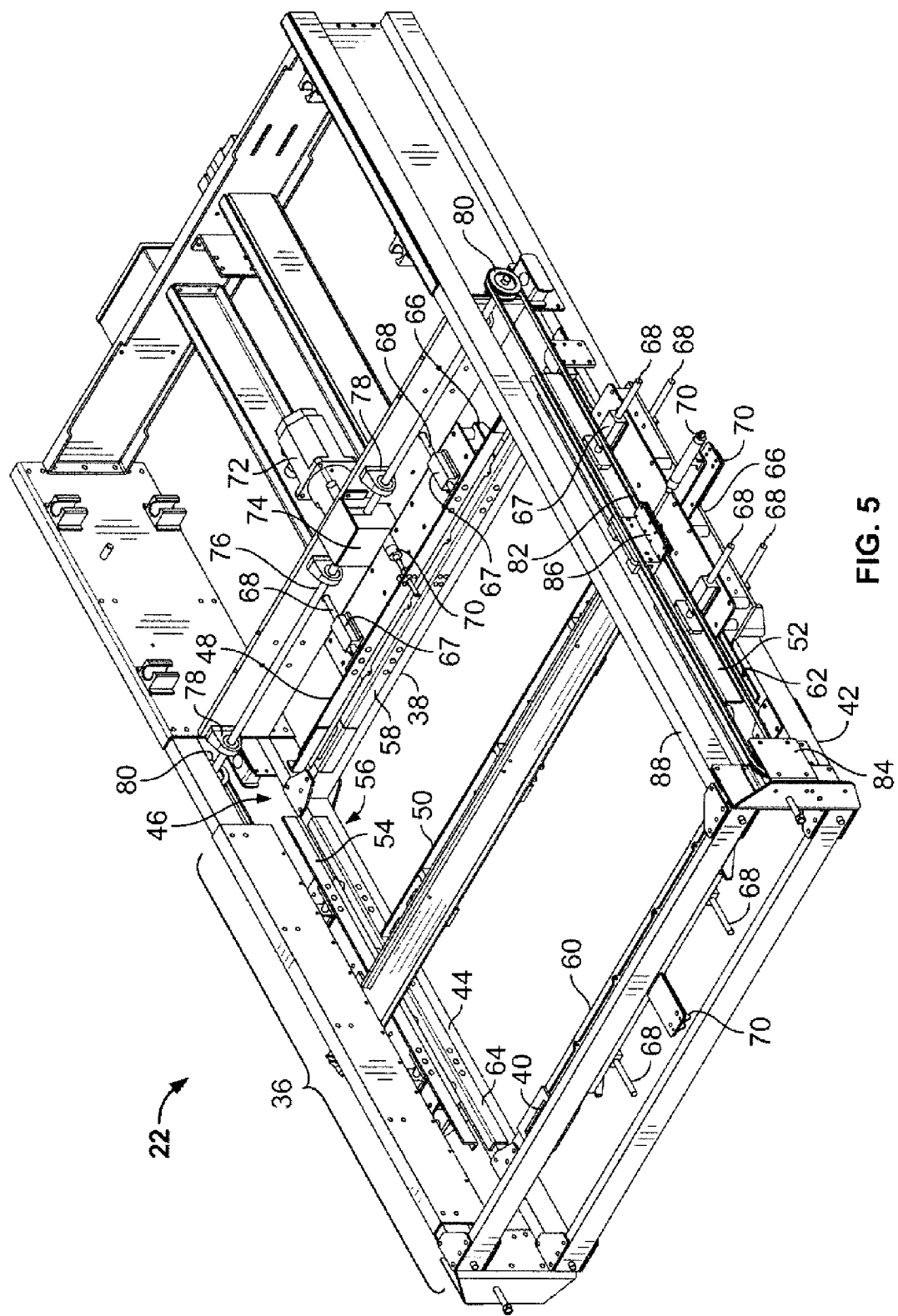
FIG. 5 is an enlarged perspective view of the lateral support system of FIG. 4 of the present invention.

Referring to FIG. 5, stabilizer 22 includes a box portion 36 defined by proximal side 38 opposite a distal side 40, with right side 42 and left side 44 bridging between the proximal and distal sides 38, 40. It is to be understood that the terms proximal, distal, right and left are relative terms as seen from a position adjacent robot 90 of palletizing cell 100 (FIG. 3), chosen to provide convenient, consistent points of reference, without limiting the present invention. Box portion 36 is substantially maintained in a vertically adjustable position over stacking area 24 (FIGS. 3, 4). In one embodiment, stabilizer box portion 36 includes both an upper guide rail assembly 46 and a lower guide rail assembly 56. Upper guide rail assembly 46 includes upper guide rails 48, 50, 52, 54 adjacent respective proximal, distal, right and left sides 38, 40, 42, 44 of box portion 36. In other words, upper guide rails 48, 50, 52, 54 substantially span the periphery of box portion 36. Box portion 36 is sized such that covering 16, 18 (FIG. 1), i.e., the slip sheets and top frame, can be inserted through the inner periphery of the box portion.

To achieve the desired lateral support along the periphery of article layer 14 (FIGS. 1, 2), upper guide rails 48, 50, 52, 54 are movable both toward and away from respective proximal, distal, right and left sides 38, 40, 42, 44 of box portion 36. As shown in FIG. 5, each of upper guide rails 48, 52, 54 are urged into movement by an actuator 70 that is secured to a frame 66 secured to each of respective proximal, right and left sides 38, 42, 44, as best seen with respect to right side 42. To constrain the movement of the guide rails 48, 52, 54 in a direction that is substantially perpendicular to respective proximal, right and left sides 38, 42, 44, a pair of guides 67 is secured to frame 66 to each slidably receive a follower 68. In the embodiment shown, it is apparent, based on the size of followers 68, that the magnitude or range of perpendicular movement of the upper guide rails 48, 52, 54 with respect to respective proximal, right and left sides 38, 42, 44, is relatively small as compared to the size of box portion 36. This requirement for the relatively small amount of perpendicular movement of upper guide rails 48, 52, 54 is due to intended function of one embodiment of stabilizer 22.

Figure 10:
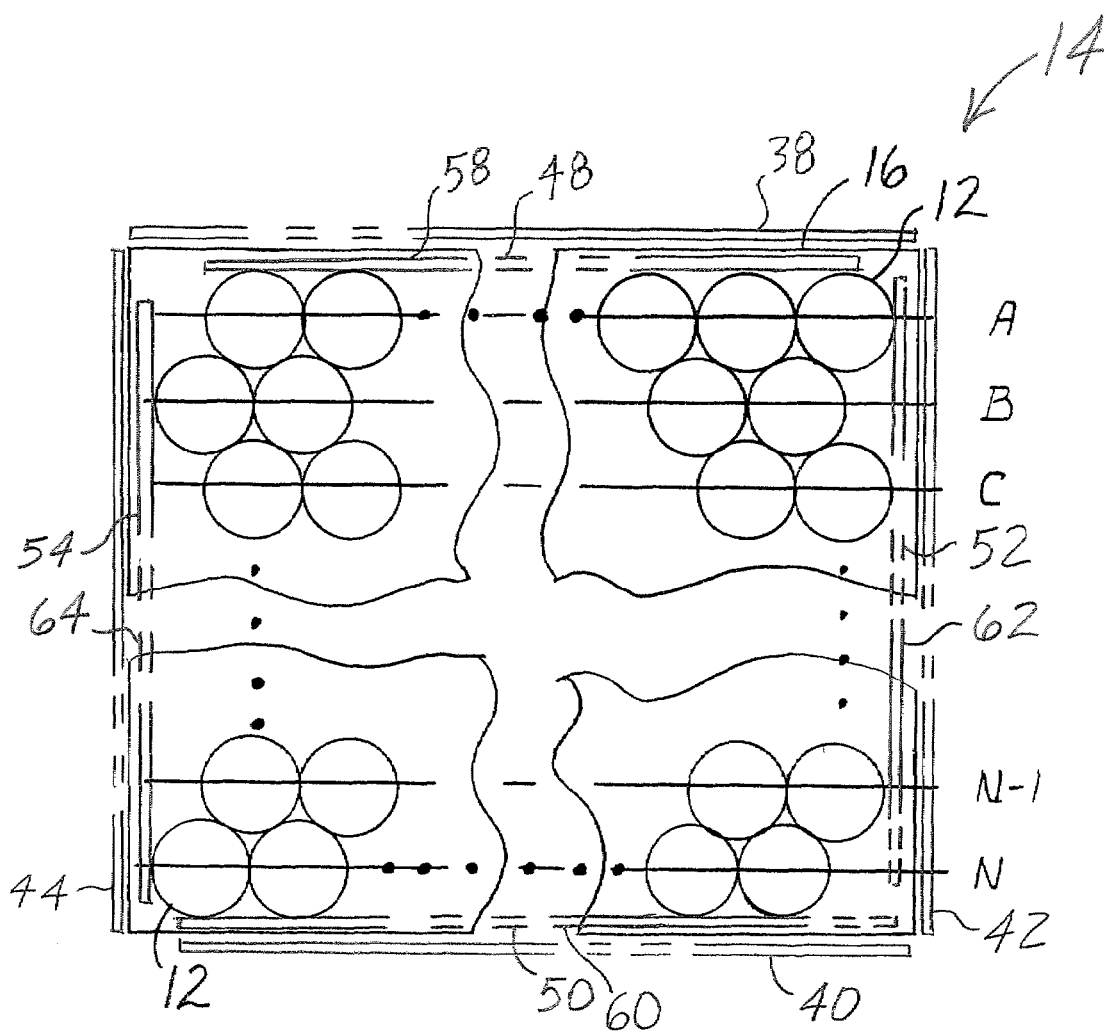
FIG. 10 is a schematic of a fully constructed article layer receiving peripheral lateral support by the present invention.

For example, referring to FIG. 10 which shows a fully constructed article layer 14 overlain on covering 16 or slip sheet. As previously discussed, box portion 36 of stabilizer 22 (FIG. 5) is sized to permit covering 16 to be passed through the inner surfaces of proximal, distal, right and left sides 38, 40, 42, 44 of the box portion. In an embodiment of stabilizer 22 (FIG. 5) in which the upper guide rails 48, 50, 52, 54 overlap the inner surfaces of respective proximal, distal, right and left sides 38, 40, 42, 44, box portion 36 is sized to permit covering 16 to be passed through the opening defined by the inner surfaces of the upper guide rails with the upper guide rails retracted against their respective sides. To provide lateral support along the periphery of fully constructed article layer 14, the upper guide rails 48, 50, 52, 54 are urged into movement by respective actuators 70 (FIG. 5) toward a corresponding side of the periphery of the fully constructed article layer 14. The guide rails 48, 50, 52, 54 are then maintained sufficiently closely spaced from their respective side of the periphery of article layer 14 such that tipping of articles 12 is substantially prevented.

In one embodiment, in contrast with upper guide rails 48, 52, 54 as shown in FIG. 5, upper guide rail 50 is capable of movement perpendicular to distal side 40 having a magnitude or range of perpendicular movement that is substantially equal to the length of right and left sides 42, 44 of box portion 36. Stated another way, upper guide rail 50 can move from a position that is adjacent to distal side 40 to a position that is adjacent proximal side 38. The mechanical linkage relating to movement of upper guide rail 50 is provided as shown in FIG. 5. An end of a motor 72 extends into a gearbox 74 secured adjacent proximal side 38 of box portion 36. A rod 76 extending through gearbox 74 is urged into rotational movement by components in gearbox 74 and rotatably carried by bearing assemblies 78. Adjacent opposed ends of rod 76 are gears 80 that each mesh with a belt 82. Each belt 82 meshingly extends between respective gear 80 and a gear assembly 84. A clamp 86 secured to each of opposed ends of upper guide rail 50 is secured to a respective belt 82. Thus, upon motor 72 actuating in one direction, gearbox 74 urges rod 76 into rotational movement along its axis, similarly urging each of belts 82, and also upper guide rail 50, into synchronized translational movement between the opposed pair of gear 80 and gear assembly 84.

Figure 11:
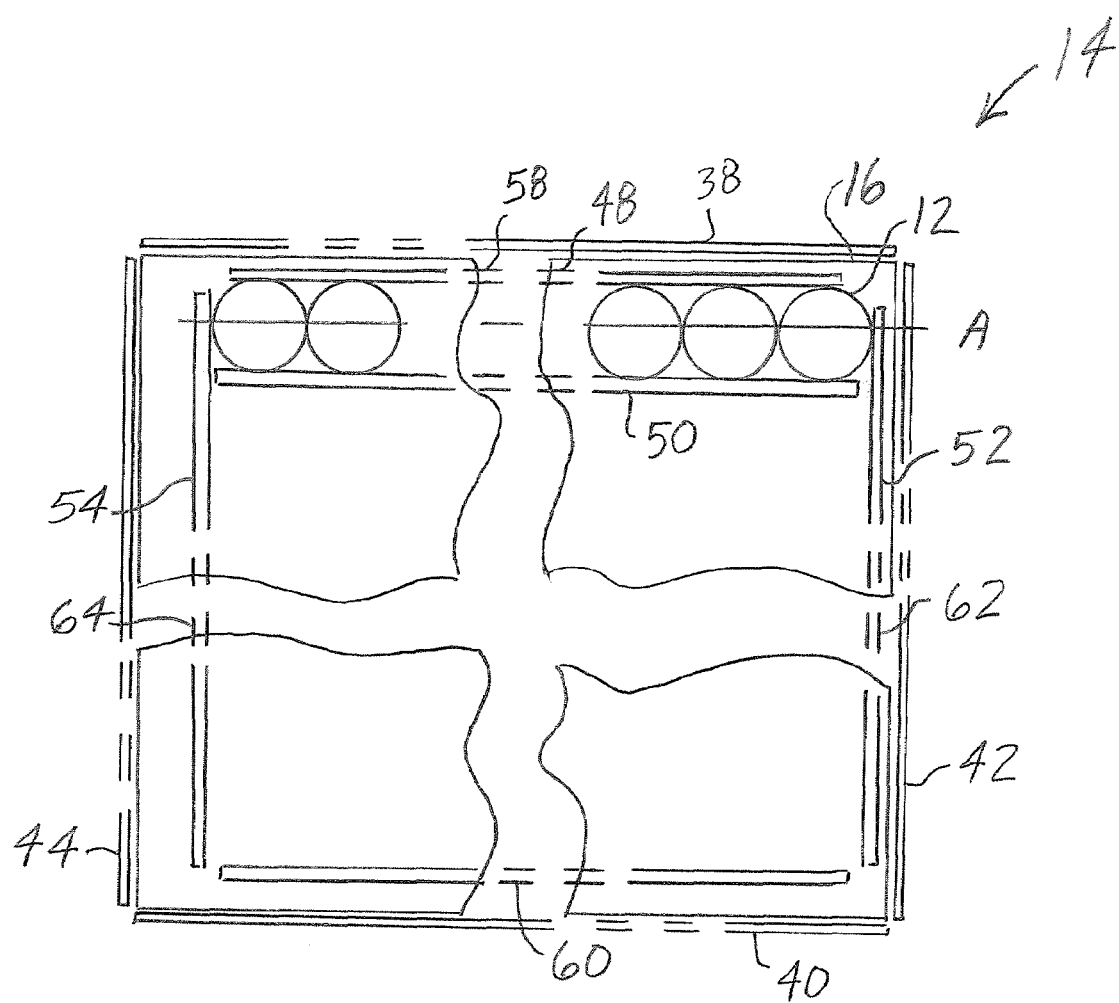
FIG. 11 is a schematic of a partially constructed article layer receiving peripheral lateral support by the present invention.

For example, the extended range of movement is shown in FIG. 11, which shows a partially constructed article layer 14. Upper guide rails 48, 52, 54 are urged into movement by respective actuators 70 (FIG. 5) toward a corresponding side of the periphery of partially constructed article layer 14 to provide lateral support. However, unlike FIG. 10, which shows a fully constructed article layer 14, FIG. 11 only contains a single row, identified as row "A". It is appreciated by those skilled in the art that for upper guide rail 50 to provide lateral support to the side of article row A facing distal side 40, upper guide rail 50 must be positioned adjacent to its corresponding side of article row A. Therefore, due to the enhanced magnitude of perpendicular movement of upper guide rail 50 between proximal and distal sides 38, 40, in addition to the respective perpendicular movements of guide rails 48, 52, 54, lateral support is provided to the periphery of partially constructed article layer 14 such that tipping of articles 12 is substantially prevented.

Referring back to FIG. 5, and similar to upper guide rail assembly 46, lower guide rail assembly 56 includes lower guide rails 58, 60, 62, 64 adjacent respective proximal, distal, right and left sides 38, 40, 42, 44 of box portion 36. Lower guide rails 58, 62, 64 operate substantially similar to corresponding upper guide rails 48, 52, 54. However, in the embodiment as shown in FIG. 5, lower guide rail 60 operates differently than corresponding upper guide rail 50, i.e., lower guide rail 60 is actuated by actuators 70, similar to the other lower guide rails 58, 62, 64. Lower guide rails 58, 60, 62, 64 also operate in a manner similar to upper guide rails 48, 50, 52, 54 as shown in FIG. 10 to laterally support a fully constructed article layer 14 (FIGS. 1, 2).

FIG. 10 shows a fully constructed article layer 14 overlain on covering 16 or slip sheet. As previously discussed, box portion 36 of stabilizer 22 (FIG. 5) is sized to permit covering 16 to be passed through the inner surfaces of proximal, distal, right and left sides 38, 40, 42, 44 of the box portion. In an embodiment of stabilizer 22 (FIG. 5) in which the lower guide rails 58, 60, 62, 64 overlap the inner surfaces of respective proximal, distal, right and left sides 38, 40, 42, 44, box portion 36 is sized to permit covering 16 to be passed through the opening defined by the inner surfaces of the lower guide rails with the lower guide rails retracted against their respective sides. To provide lateral support along the periphery of fully constructed article layer 14, the lower guide rails 58, 60, 62, 64 are urged into movement by respective actuators 70 (FIG. 5) toward a corresponding side of the fully constructed article layer 14. The lower guide rails 58, 60, 62, 64 are then maintained sufficiently closely spaced from their respective side of article layer 14, providing lateral support to the periphery of the article layer 14 such that tipping of articles 12 is substantially prevented.

An explanation regarding the intended usage of the embodiment of stabilizer 22 or lateral support system as part of the palletizing cell 100 (FIG. 3) is now provided, referring to FIGS. 1-11. First, a pallet 11 is transported via pallet conveyor 15 to stacking area 24. Robot 90 then transports and places covering 16 over pallet 11. Although it is realized that robot 90 operates by virtue of an end effector or attachment, it is to be understood that reference to robot 90 is intended to indicate the proper end effector or attachment suitable to achieve the particular task, e.g., transporting and placing articles or coverings, is being provided by the robot. Robot 90 is then positioned to transport a plurality of articles 12 that are arranged along collection area 94 of article conveyor 92 to stacking area 24. Although the embodiment of article conveyor 92 is directed to a one-line conveyor, conveyors having more than one line are contemplated. Thus one or more rows of articles, e.g., row A (FIG. 11), also referred to as a plurality of arranged articles, is transported from collection area 94 to stacking area 24.

Figure 6:
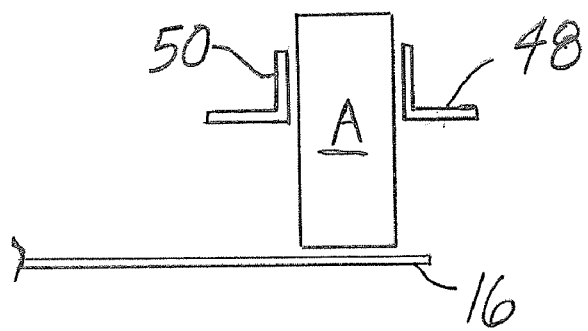
FIGS. 6-8 show sequential steps in the operation of the lateral support system of an embodiment of the present invention.

Referring to FIGS. 6 and 11, as robot 90 (not shown) sets article row A onto covering 16, and prior to robot 90 releasing article row A, upper guide rails 48, 50, 52, 54 move toward article row A, providing lateral support along the periphery of the article row. The lateral support provided by the method of the present invention along the periphery of article row A, and also along the incrementally increasing periphery that includes subsequently added rows of the article layer 14 under construction, is continuous. That is, even while the article rows B-N are being added to article row A to construct article layer 14, at all times during construction of the article layer, upper guide rails 48, 52, 54 apply continuous lateral support along the periphery of row(s) of the article layer being constructed. However, upper guide rail 50 provides substantially continuous lateral support to the corresponding portion of the periphery of article layer 14 facing upper guide rail 50 while the article layer is being constructed.

Figure 7:
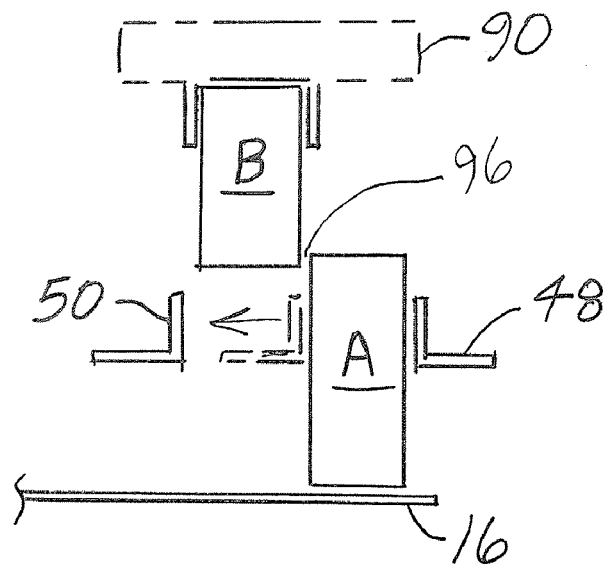
Figure 8:
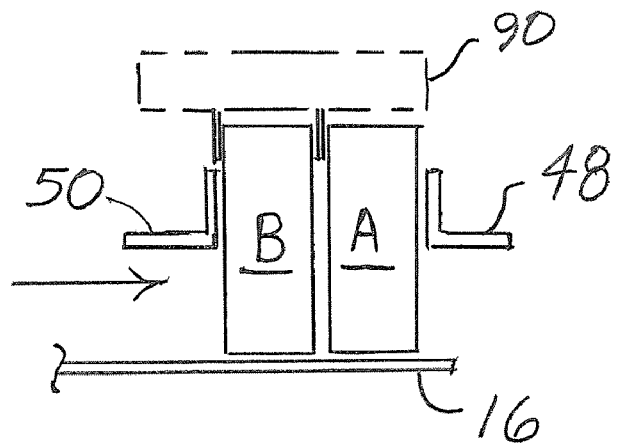

The clarification between continuous and substantially continuous can be explained using FIGS. 7-8. Once article row A has been added as previously discussed and shown in FIG. 6, robot 90 is re-positioned to transport a subsequent plurality of articles 12, i.e., article row B, that is arranged along collection area 94 of article conveyor 92 to stacking area 24. As shown in FIG. 7, robot 90 transports article row B, also referred to as a subsequent plurality of articles or subsequent plurality of articles to be arranged in the article layer. In response to a lower portion of article row B being brought adjacent to an upper portion of already arranged article row A, upper guide rail 50 is urged in a direction away from article row A. However, prior to this movement of upper guide rail 50, the lower portion of article row B is brought into a support position 96 with respect to the upper portion of article row A. Support position 96 ensures that the portion of the periphery of article row A continuously receives lateral support. It is to be understood that support position 96 can, but does not necessarily require or imply that any of the articles of article row A are placed in physical contact with any of the articles of article row B. Support position 96 only indicates that, at the least, even if no physical contact is established between the articles of article rows A and B, that the distance between articles of article rows A and B is sufficiently small to substantially prevent row A from tipping.

Continuing to refer to FIGS. 7-8, once support position 96 has been established between article rows A and B, and upper guide rail 50 is retracted away from row A (FIG. 7), robot 90 arranges article row B adjacent article row A on covering 16 (FIG. 8). However, prior to robot 90 releasing article row B, upper guide rail 50 returns to a support position along the corresponding portion of the periphery of the article layer being constructed, i.e., the combined periphery of article rows A and B, or article row B. The controller or control system (not shown), such as a microprocessor, controls the upper and lower guide rails to provide lateral support based on predetermined settings. Depending upon the type of articles being palletized, lateral support may best be achieved by providing actual physical contact as well as an associated force exerted by the guide rails to corresponding portions of the article layer periphery, or by maintaining sufficient proximity, such as a predetermined spacing, between the guide rails and the corresponding portions of the article layer periphery without physical contact. It is appreciated by those skilled in the art that the sequences previously discussed in association with FIGS. 7 and 8 are repeated to fully construct article layer 14 (FIG. 1).

Referring to FIGS. 1, 3 and 5, once the first article layer 14 is fully constructed, a covering 16 may then be placed over the newly constructed article layer, the guide rails 48, 50, 52, 54 of upper guide rail assembly are retracted from the periphery of the newly constructed article layer and the stabilizer 22 is vertically moved to a position suitable to construct the next article layer in a manner previously discussed. It is appreciated that additional article layers 14 are constructed until a top article layer has been constructed, upon which a top covering, such as a top frame 18 is placed over the top article layer. Optionally, stacking layer 24 can then be configured to rotate the full pallet of palletized articles 10 to permit application of a wrapping to better stabilize the full pallet of palletized articles for shipping, or the full pallet can be moved along the conveyor to a station (not shown) to wrap the full pallet. In either event, upon sufficiently vertically raising the stabilizer 22, the full pallet of palletized articles 10 can be moved exterior of the palletizing cell 100 and stacking area 24 receiving another pallet 11 to repeat the process of constructing another pallet of palletized articles.

Figure 9:
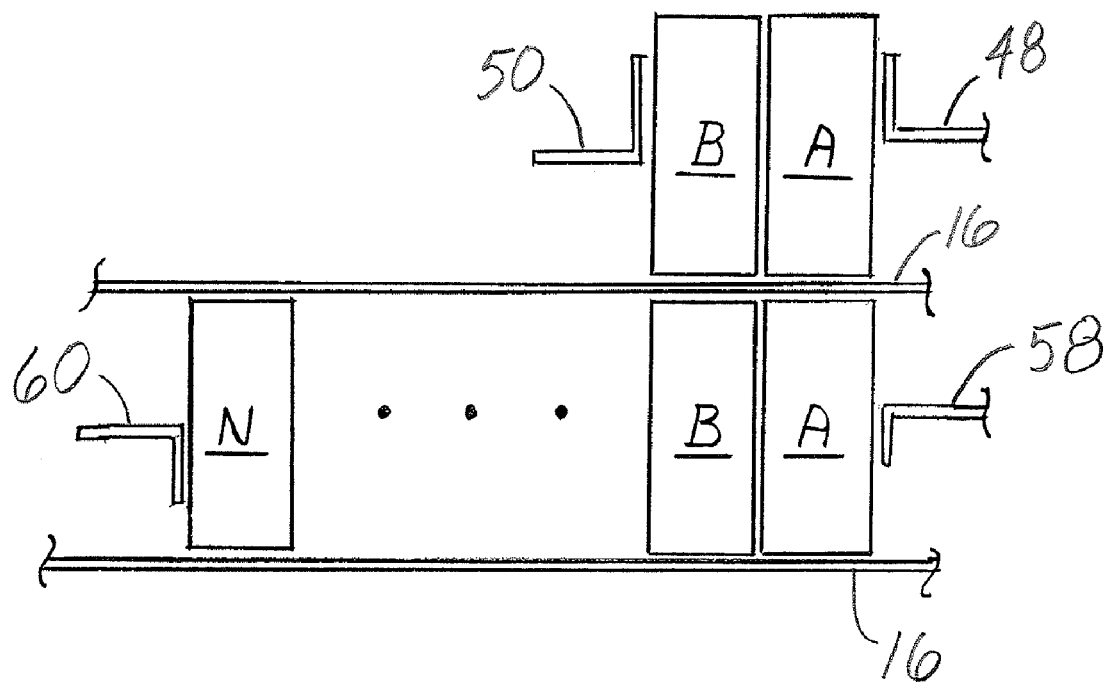
FIG. 9 shows an elevation view of an embodiment of the lateral support system of the present invention.

In an embodiment of the invention as shown by FIG. 9, the vertical distance between the upper and lower guide rail assemblies 46, 56 is sufficient so that each guide assembly can be used to provide lateral support to separate article layers. That is, while the guide rails of the upper assembly are being used to provide continuous lateral support to the periphery of the article layer under construction, the guide rails of the lower guide rail assembly can be used to provide continuous lateral support to the periphery of the most recently fully constructed article layer, which is also the article layer adjacent to the article layer under construction. It is also to be understood that in an alternate embodiment, additional rail guide assemblies can be used to support more than two article layers, if desired. Further, additional guide rail assemblies can be used to provide support along a portion of a side of the box portion 36 of stabilizer 22 (FIG. 5). An example for such a construction could be used in instances where a partial article row is constructed, and continuous lateral support is also desired.

It is to be understood that other sources of power for the actuators or motors can include, but are not limited to, electric, hydraulic and pneumatic power.

It is also to be understood that each of the guide rails can be configured to have a range of movement similar to that of upper guide rail 50 (FIG. 5). Further, additional guide rails can be incorporated that do not extend the length of an entire side of box portion 36 in order to provide lateral support for partially constructed article rows.

It is to be understood that while an embodiments of the stabilizer is shown having a box portion that includes four substantially perpendicular sides, other structures having a closed geometric shape, or even an open geometric shape, that can provide lateral support for article layers, either fully constructed or being constructed, is contemplated. Additionally, the guide rails, while shown in one embodiment as being substantially straight or linear, can be curved or non-linear, as long as lateral support of the article layers, either fully constructed or being constructed, is provided.

It is also to be understood that while cylindrically shaped articles, as shown in one embodiment, are arranged in staggered rows, articles having, for example, rectangular cylindrical profiles, could be arranged in rows in which the articles are aligned.

It is to be understood that using the construction of the present invention, in which the upper and lower guide rail assemblies are driven by pneumatic actuators, the control system is not required to "know" the positions of the peripheral sides of the article layer. That is, the guide rails are actuated to extend to the maximum extent possible, being stopped by the presence of articles. As a result, programming to accommodate different article sizes is greatly simplified, made more adaptable and cost-effective.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for palletizing articles, the steps comprising:
   arranging a plurality of articles within a first collection area;
   transporting the plurality of articles from the first collection area to a stacking area for constructing a palletized article layer;
   continuously laterally supporting the periphery of the plurality of articles arranged within the stacking area to substantially prevent tipping of the plurality of articles;
   arranging a subsequent plurality of articles within the first collection area;
   transporting the subsequent plurality of articles from the first collection area to the stacking area adjacent the plurality of arranged articles, the periphery of the plurality of arranged articles being continuously laterally supported while the subsequent plurality of articles is being arranged, and upon the arrangement of the subsequent plurality of articles, the periphery of the plurality of arranged and subsequently arranged articles being laterally supported; and
   repeating the arrangement and transporting of subsequent plurality of articles until the article layer is constructed.

2. The method of claim 1 including the steps of constructing subsequent article layers vertically stacked on top of each other until a full pallet of article layers is constructed.

3. The method of claim 1 wherein the step of laterally supporting the periphery of the plurality of articles is achieved by a stabilizer.

4. The method of claim 3 wherein the stabilizer is used in the step of constructing subsequent article layers to laterally support the periphery of the plurality of articles of an article layer being constructed and laterally support the periphery of the plurality of articles of an adjacent layer of articles.

5. The method of claim 1 wherein in the step of transporting the subsequent plurality of articles, a portion of the periphery of the plurality of arranged articles is laterally supported by the subsequent plurality of articles while the subsequent plurality of articles is being arranged.

6. The method of claim 5 wherein in the step of transporting the subsequent plurality of articles, the periphery of the plurality of arranged and subsequently arranged articles is laterally supported by a stabilizer.

7. The method of claim 1 wherein the step of transporting the plurality of articles includes arranging the plurality of articles in a row.

8. The method of claim 7 wherein the step of transporting the subsequent plurality of articles includes arranging the subsequent plurality of articles in a row that is substantially parallel to the row formed by the plurality of arranged articles.

9. The method of claim 7 wherein the step of transporting the subsequent plurality of articles includes arranging the subsequent plurality of articles in a row that is substantially aligned with the row formed by the plurality of arranged articles.

10. The method of claim 7 wherein the step of transporting the subsequent plurality of articles includes arranging the subsequent plurality of articles in at least two portions of a row, including a first row portion that is substantially aligned with the row formed by the plurality of arranged articles and a second row portion that is substantially parallel to the row formed by the plurality of arranged articles.

11. The method of claim 1 further including the step of placing a slip sheet between article layers.

12. The method of claim 11 further including the step of placing a top sheet or a tray over the top article layer.

13. A method for palletizing articles, the steps comprising:
    arranging a plurality of articles within a first collection area;
    transporting the plurality of articles from the first collection area to a stacking area for constructing a palletized article layer;
    continuously laterally supporting the periphery of the plurality of articles arranged within the stacking area to substantially prevent tipping of the plurality of articles while the plurality of articles are arranged;
    arranging a subsequent plurality of articles within the first collection area;
    transporting the subsequent plurality of articles from the first collection area to the stacking area adjacent the plurality of arranged articles, the periphery of the plurality of arranged articles being continuously laterally supported while the subsequent plurality of articles is being arranged, and upon the arrangement of the subsequent plurality of articles, the periphery of the plurality of arranged and subsequently arranged articles being laterally supported;
    repeating the steps of arranging and transporting of subsequent plurality of articles until the article layer is constructed;
    placing a covering over the constructed article layer;
    repeating the steps of arranging, transporting and laterally supporting plurality of articles, arranging, transporting and repeating the steps of arranging and transporting of subsequent plurality of articles to construct article layers vertically stacked on top of each other until a full pallet of article layers is constructed.

* * * * *